US011649892B2

(12) United States Patent
Fujii et al.

(10) Patent No.: US 11,649,892 B2
(45) Date of Patent: May 16, 2023

(54) HYDRAULIC PRESSURE CALCULATION APPARATUS

(71) Applicant: TOYOTA JIDOSHA KABUSHIKI KAISHA, Toyota (JP)

(72) Inventors: Kota Fujii, Nisshin (JP); Atsushi Tabata, Okazaki (JP); Koichi Okuda, Toyota (JP); Ken Imamura, Toyota (JP); Hideaki Bunazawa, Toyota (JP); Keita Sasaki, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 17/365,676

(22) Filed: Jul. 1, 2021

(65) Prior Publication Data
US 2022/0042597 A1 Feb. 10, 2022

(30) Foreign Application Priority Data
Aug. 7, 2020 (JP) .............................. JP2020-135297

(51) Int. Cl.
*F16H 61/04* (2006.01)
*F16H 59/18* (2006.01)
*F16H 59/70* (2006.01)
*F16H 59/42* (2006.01)
*F16H 61/02* (2006.01)
(Continued)

(52) U.S. Cl.
CPC .............. *F16H 61/04* (2013.01); *F16H 59/18* (2013.01); *F16H 59/42* (2013.01); *F16H 59/70* (2013.01); *F16H 59/72* (2013.01); *F16H 61/0265* (2013.01); *F16H 2059/683* (2013.01); *F16H 2059/6807* (2013.01); *F16H 2061/0096* (2013.01)

(58) Field of Classification Search
CPC .. F16H 61/04; F16H 61/30; F16H 2061/0096; F16H 59/18; F16H 59/42; F16H 59/70; F16H 59/72; F16H 2059/6807; F16H 2059/683
See application file for complete search history.

(56) References Cited

U.S. PATENT DOCUMENTS

2019/0277354 A1  9/2019  Oda
2022/0018431 A1*  1/2022  Fujii ..................... F01P 11/16

FOREIGN PATENT DOCUMENTS

JP  2019-157896 A  9/2019

* cited by examiner

*Primary Examiner* — David R Morris
(74) *Attorney, Agent, or Firm* — Oliff PLC

(57) ABSTRACT

A hydraulic pressure calculation apparatus is applied to a gear shifting system including a transmission configured to switch between a connected state and a disconnected state of a friction engagement element depending on a hydraulic pressure supplied from a hydraulic circuit, and a hydraulic controller configured to control the hydraulic circuit. The hydraulic pressure calculation apparatus includes a memory and a processor. The memory stores pieces of mapping data of a plurality of phases obtained by dividing a period from a start to an end of switching between the connected state and the disconnected state of the friction engagement element. Each piece of the mapping data defines a mapping. The processor is configured to output, as an output variable, an estimated hydraulic pressure variable indicating an estimated value of an actual hydraulic pressure supplied from the hydraulic circuit to the friction engagement element.

6 Claims, 3 Drawing Sheets

(51) Int. Cl.
*F16H 59/72* (2006.01)
*F16H 59/68* (2006.01)
*F16H 61/00* (2006.01)

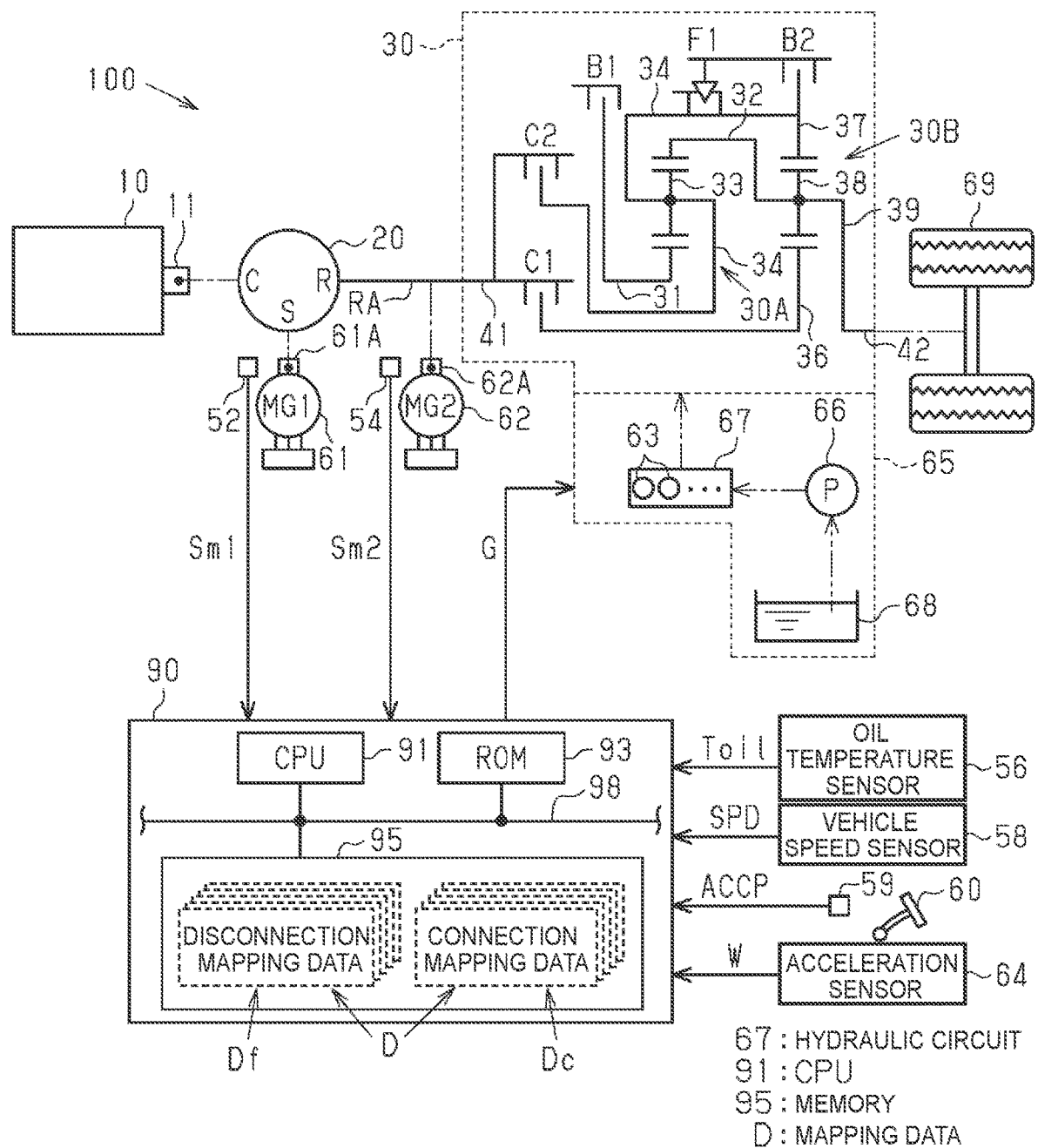

HYDRAULIC PRESSURE CALCULATION APPARATUS

CROSS-REFERENCE TO RELATED APPLICATION

This application claims priority to Japanese Patent Application No. 2020-135297 filed on Aug. 7, 2020, incorporated herein by reference in its entirety.

BACKGROUND

1. Technical Field

The present disclosure relates to a hydraulic pressure calculation apparatus.

2. Description of Related Art

A vehicle disclosed in Japanese Unexamined Patent Application Publication No. 2019-157896 (JP 2019-157896 A) includes an automatic transmission and a controller. The automatic transmission includes a plurality of friction engagement elements. A connected state or a disconnected state of each friction engagement element is switched depending on a hydraulic pressure supplied from a hydraulic circuit. The controller calculates an instructive hydraulic pressure to be supplied to the friction engagement element. The controller controls the hydraulic pressure in the hydraulic circuit based on the calculated instructive hydraulic pressure.

The controller calculates a time constant indicating a delay in a response of an actual hydraulic pressure to the instructive hydraulic pressure. The controller calculates an estimated hydraulic pressure that is an estimated value of the actual hydraulic pressure based on the time constant. The controller reflects the delay in the response to the instructive hydraulic pressure in the estimated hydraulic pressure.

SUMMARY

The delay in the response of the actual hydraulic pressure to the instructive hydraulic pressure is not always constant during the switching of the connected state and the disconnected state of the friction engagement element. Therefore, there is a possibility that the estimated hydraulic pressure cannot accurately be calculated when the delay in the response is only taken into consideration as in JP 2019-157896 A.

A hydraulic pressure calculation apparatus according to one aspect of the present disclosure is applied to a gear shifting system including a transmission configured to switch between a connected state and a disconnected state of a friction engagement element depending on a hydraulic pressure supplied from a hydraulic circuit, and a hydraulic controller configured to control the hydraulic circuit. The hydraulic pressure calculation apparatus includes a memory and a processor. The memory stores pieces of mapping data of a plurality of phases obtained by dividing a period from a start of switching between the connected state and the disconnected state of the friction engagement element to an end of switching between the connected state and the disconnected state of the friction engagement element. Each of the pieces of mapping data defines a mapping. The processor is configured to output, as an output variable, an estimated hydraulic pressure variable that is a variable indicating an estimated value of an actual hydraulic pressure supplied from the hydraulic circuit to the friction engagement element. The mapping includes, as one of a plurality of input variables, an instructive hydraulic pressure variable that is a variable indicating an instructive hydraulic pressure calculated by the hydraulic controller as an instruction value of the hydraulic pressure to be supplied from the hydraulic circuit to the friction engagement element. The processor is configured to execute an acquisition process for acquiring values of the input variables, a selection process for selecting, from among the pieces of mapping data of the phases, a piece of the mapping data associated with a phase in which the values of the input variables are acquired, and a calculation process for calculating a value of the output variable by inputting the values of the input variables acquired in the acquisition process to the mapping of the mapping data selected in the selection process.

According to the configuration described above, the mappings dedicated to the individual phases are used. Therefore, even if a relationship between the instructive hydraulic pressure and the actual hydraulic pressure differs between the phases, the difference can be reflected in the output variable.

In the aspect described above, the memory may store, for the phases, pieces of connection mapping data that are mapping data to be used when the friction engagement element is switched to the connected state, and pieces of disconnection mapping data that are mapping data to be used when the friction engagement element is switched to the disconnected state. The processor may be configured to, in a case where the input variables are acquired in the acquisition process when the friction engagement element is switched to the connected state, select, from among the pieces of connection mapping data of the phases, a piece of the connection mapping data associated with a phase in which the input variables are acquired, in the selection process. The processor may be configured to, in a case where the input variables are acquired in the acquisition process when the friction engagement element is switched to the disconnected state, select, from among the pieces of disconnection mapping data of the phases, a piece of the disconnection mapping data associated with a phase in which the input variables are acquired, in the selection process.

In the configuration described above, the dedicated mappings are used for the case where the friction engagement element is switched to the connected state and the case where the friction engagement element is switched to the disconnected state. Therefore, even if the way of changing the hydraulic pressure differs between the case of switching to the connected state and the case of switching to the disconnected state, accurate output variables suited to both the cases can be obtained.

In the aspect described above, an accelerator operation amount variable that is a variable indicating an operation amount of an accelerator pedal of a vehicle on which the transmission is mounted may be included as one of the input variables. By including the accelerator operation amount variable as one of the input variables as in the configuration described above, the output variable can be obtained based on a torque applied to the transmission.

In the aspect described above, a gear shifting variable that is a variable indicating a change in a gear stage before and after switching between the connected state and the disconnected state of the friction engagement element may be included as one of the input variables. According to the configuration described above, an accurate output variable can be obtained even if a deviation of the actual hydraulic pressure from the instructive hydraulic pressure varies depending on the change in the gear stage.

In the aspect described above, an oil temperature variable that is a variable indicating a temperature of oil in the hydraulic circuit may be included as one of the input variables. According to the configuration described above, the output variable can be obtained based on the oil temperature that may affect the actual hydraulic pressure.

In the aspect described above, an input shaft variable that is a variable indicating a rotation speed of an input shaft of the transmission or a change in the rotation speed of the input shaft may be included as one of the input variables. The rotation speed of the input shaft and the change in the rotation speed of the input shaft may serve as an index of a chronological stage in the same phase. According to the configuration described above, a finer stage than the division range of each phase can be reflected in the output variable.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic structural diagram of a vehicle;

FIG. 2 is an explanatory drawing illustrating relationships between gear stages of an automatic transmission and friction engagement elements;

DETAILED DESCRIPTION OF EMBODIMENTS

Figure 3:
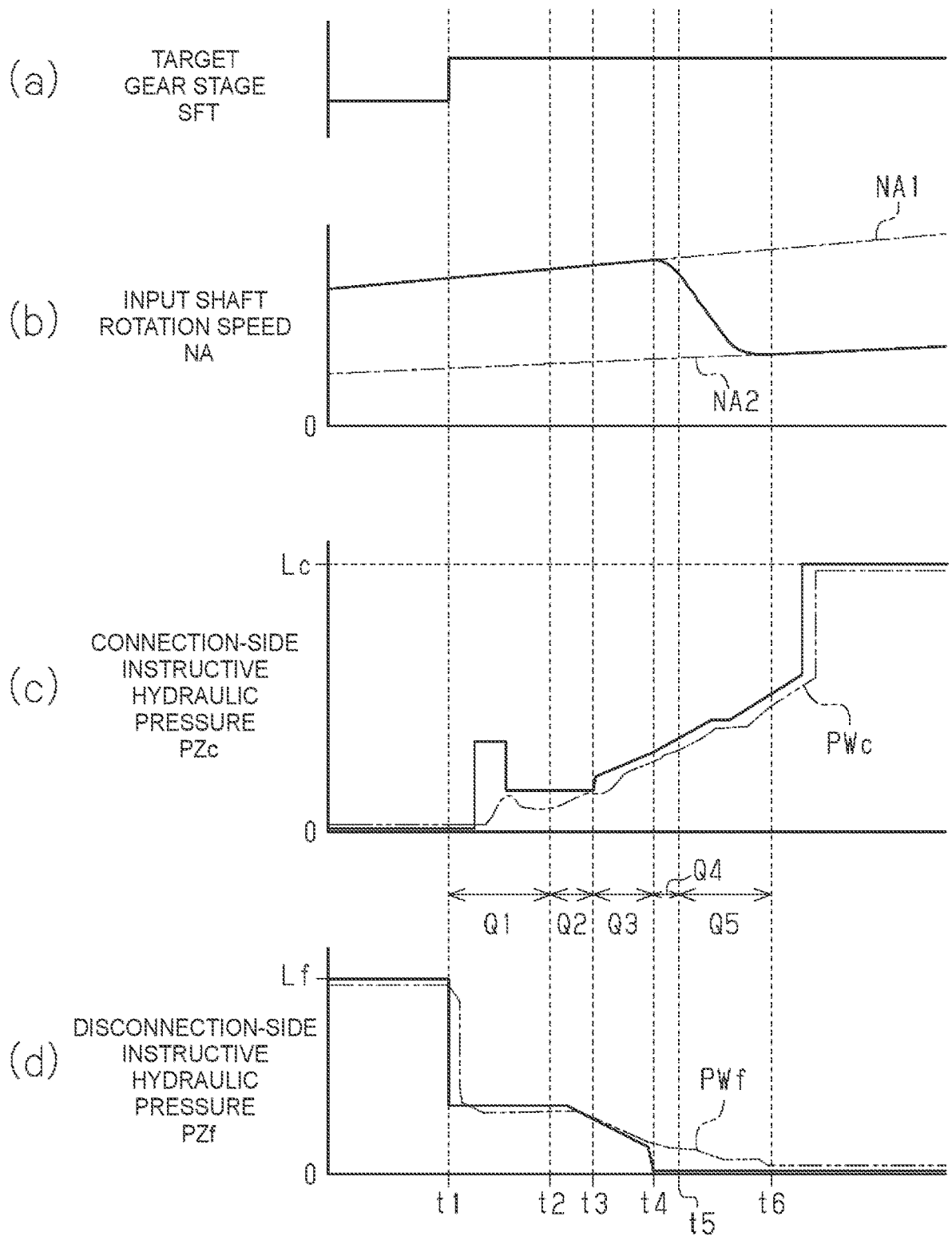
FIG. 3 is a time chart illustrating an example of progress of gear shifting control.

A hydraulic pressure calculation apparatus of one embodiment is described below with reference to the drawings. First, a schematic structure of a vehicle is described. As illustrated in FIG. 1, a vehicle 100 includes an internal combustion engine 10, a power split device 20, an automatic transmission 30, driving wheels 69, a hydraulic apparatus 65, a first motor generator 61, and a second motor generator 62.

The power split device 20 is coupled to a crankshaft 11 that is an output shaft of the internal combustion engine 10. The power split device 20 is a planetary gearing mechanism including a sun gear S, a ring gear R, and a carrier C. The crankshaft 11 is coupled to the carrier C of the power split device 20. A rotational shaft 61A of the first motor generator 61 is coupled to the sun gear S. A rotational shaft 62A of the second motor generator 62 is coupled to a ring gear shaft RA that is an output shaft of the ring gear R. An input shaft 41 of the automatic transmission 30 is also coupled to the ring gear shaft RA. The right and left driving wheels 69 are coupled to an output shaft 42 of the automatic transmission 30 via a differential gear (not illustrated).

When the internal combustion engine 10 is driven and a torque is input to the carrier C of the power split device 20 from the crankshaft 11, the torque is split into a torque on the sun gear S side and a torque on the ring gear R side. When the first motor generator 61 operates as a motor and a torque is input to the sun gear S of the power split device 20, the torque is split into a torque on the carrier C side and a torque on the ring gear R side.

When the second motor generator 62 operates as a motor and a torque is input to the ring gear shaft RA, the torque is transmitted to the automatic transmission 30. When a torque from the driving wheels 69 is input to the second motor generator 62 via the ring gear shaft RA, the second motor generator 62 functions as a generator. Thus, a regenerative braking force can be generated in the vehicle 100.

The automatic transmission 30 includes a first planetary gearing mechanism 30A, a second planetary gearing mechanism 30B, a first clutch C1, a second clutch C2, a first brake B1, a second brake B2, and a one-way clutch F1.

The first planetary gearing mechanism 30A includes a sun gear 31, a ring gear 32, pinion gears 33, and a carrier 34. The ring gear 32 is coupled to the sun gear 31 via the pinion gears 33. The pinion gears 33 are supported on the carrier 34.

The sun gear 31 is coupled to the first brake B1. The first brake B1 is switched to a connected state or a disconnected state depending on a pressure of oil supplied to the first brake B1 (hereinafter referred to as "hydraulic pressure"). Specifically, the first brake B1 is switched from the disconnected state to the connected state when the hydraulic pressure supplied to the first brake B1 increases. In the connected state of the first brake B1, rotation of the sun gear 31 is braked.

The one-way clutch F1 is coupled to the carrier 34. The one-way clutch F1 restricts rotation of the carrier 34 to one side, and permits rotation of the carrier 34 to the other side. That is, the one-way clutch F1 is switched to a restricting state for restricting the rotation of the carrier 34 or a permitting state for permitting the rotation of the carrier 34. The carrier 34 is coupled to the second brake B2. Similarly to the first brake B1, the second brake B2 is switched to a connected state or a disconnected state depending on a hydraulic pressure supplied to the second brake B2. In the connected state of the second brake B2, the rotation of the carrier 34 is braked.

The second planetary gearing mechanism 30B includes a sun gear 36, a ring gear 37, pinion gears 38, and a carrier 39. The ring gear 37 is coupled to the sun gear 36 via the pinion gears 38. The pinion gears 38 are supported on the carrier 39. The output shaft 42 is coupled to the carrier 39.

In the planetary gearing mechanisms structured as described above, the carrier 34 of the first planetary gearing mechanism 30A is coupled to the ring gear 37 of the second planetary gearing mechanism 30B. The ring gear 32 of the first planetary gearing mechanism 30A is coupled to the carrier 39 of the second planetary gearing mechanism 30B.

The sun gear 36 of the second planetary gearing mechanism 30B is coupled to the input shaft 41 via the first clutch C1. The first clutch C1 is switched to a connected state or a disconnected state depending on a hydraulic pressure supplied to the first clutch C1. Specifically, the first clutch C1 is switched from the disconnected state to the connected state when the hydraulic pressure supplied to the first clutch C1 increases. In the connected state of the first clutch C1, the sun gear 36 of the second planetary gearing mechanism 30B rotates together with the input shaft 41.

The carrier 34 of the first planetary gearing mechanism 30A is coupled to the input shaft 41 via the second clutch C2. Similarly to the first clutch C1, the second clutch C2 is switched to a connected state or a disconnected state depending on a hydraulic pressure supplied to the second clutch C2. In the connected state of the second clutch C2, the carrier 34 of the first planetary gearing mechanism 30A rotates together with the input shaft 41. In this embodiment, the first clutch C1, the second clutch C2, the first brake B1, and the second brake B2 are friction engagement elements.

As illustrated in FIG. 2, gear stages of the automatic transmission 30 are switched based on combinations of the connected states or the disconnected states of the first clutch C1, the second clutch C2, the first brake B1, and the second brake B2 and a combination of the restricting state or the permitting state of the one-way clutch F1. The automatic transmission 30 can make a total of five gear stages including four gear stages that are "first gear" to "fourth gear" for forward traveling and one gear stage that is "R" for reverse traveling.

In FIG. 2, a symbol "O" represents the connected state of the friction engagement element such as the first clutch C1, and the restricting state of the one-way clutch F1. A symbol "O" represents the connected state or the disconnected state of the second brake B2. A blank field represents the disconnected state of the friction engagement element such as the first clutch C1, and the permitting state of the one-way clutch F1. For example, when the gear stage of the automatic transmission 30 is second gear, the first clutch C1 and the first brake B1 are connected, the second clutch C2 and the second brake B2 are disconnected, and the one-way clutch F1 permits rotation.

As illustrated in FIG. 1, the hydraulic apparatus 65 is mounted on the vehicle 100. The hydraulic apparatus 65 includes an oil pump 66, a hydraulic circuit 67, and an oil pan 68. The oil pan 68 stores oil to be supplied to the automatic transmission 30. The oil pump 66 is a so-called mechanical oil pump configured to operate by receiving a torque of the crankshaft 11. The oil pump 66 supplies the oil stored in the oil pan 68 to the hydraulic circuit 67. The hydraulic circuit 67 includes solenoid valves 63 for the individual friction engagement elements. By controlling the solenoid valves 63, hydraulic pressures to be supplied to the first clutch C1, the second clutch C2, the first brake B1, and the second brake B2 are adjusted.

A first rotation angle sensor 52, a second rotation angle sensor 54, an oil temperature sensor 56, a vehicle speed sensor 58, an accelerator position sensor 59, and an acceleration sensor 64 are mounted on the vehicle 100. An accelerator pedal 60 is also mounted on the vehicle 100. The first rotation angle sensor 52 detects a first rotation angle Sm1 that is a rotation angle of the rotational shaft 61A of the first motor generator 61. The second rotation angle sensor 54 detects a second rotation angle Sm2 that is a rotation angle of the rotational shaft 62A of the second motor generator 62. The oil temperature sensor 56 detects an oil temperature Toil of the oil in the hydraulic circuit 67. The vehicle speed sensor 58 detects a vehicle speed SPD that is a traveling speed of the vehicle 100. The accelerator position sensor 59 detects an accelerator operation amount ACCP that is an operation amount of the accelerator pedal 60 operated by a driver. The acceleration sensor 64 detects a longitudinal acceleration W of the vehicle 100.

Next, a control configuration of the vehicle 100 is described. First, a basic configuration and basic control of a controller are described. The vehicle 100 includes a controller 90. A signal indicating the first rotation angle Sm1 is input to the controller 90 from the first rotation angle sensor 52. A signal indicating the second rotation angle Sm2 is input to the controller 90 from the second rotation angle sensor 54. A signal indicating the oil temperature Toil is input to the controller 90 from the oil temperature sensor 56. A signal indicating the vehicle speed SPD is input to the controller 90 from the vehicle speed sensor 58. A signal indicating the accelerator operation amount ACCP is input to the controller 90 from the accelerator position sensor 59.

The controller 90 may be constructed as one or more processors configured to execute various processes based on computer programs (software). The controller 90 may also be constructed as one or more dedicated hardware circuits such as an application-specific integrated circuit (ASIC) configured to execute at least a part of the various processes, or as circuitry including a combination of those hardware circuits. The processor includes a central processing unit (CPU) 91 and a memory including a random-access memory (RAM) and a read-only memory (ROM) 93. The memory stores program codes or commands for causing the CPU 91 to execute processes. The memory, that is, a computer-readable medium includes any available medium accessible to a general-purpose or dedicated computer. The controller 90 includes a memory 95 that is an electrically rewritable non-volatile memory. The CPU 91, the ROM 93, and the memory 95 are communicable with each other via an internal bus 98.

For example, the CPU 91 controls the internal combustion engine 10, the first motor generator 61, and the second motor generator 62 by executing various programs stored in the ROM 93. Specifically, the CPU 91 calculates, based on the accelerator operation amount ACCP and the vehicle speed SPD, requested vehicle power that is a requested value of power necessary for the vehicle 100 to travel. The CPU 91 determines distribution of torques of the internal combustion engine 10, the first motor generator 61, and the second motor generator 62 based on the requested vehicle power. The CPU 91 controls power of the internal combustion engine 10 and power running and regeneration of the first motor generator 61 and the second motor generator 62 based on the distribution of the torques of the internal combustion engine 10, the first motor generator 61, and the second motor generator 62.

Next, control related to gear shifting of the automatic transmission 30 is described. The CPU 91 controls the automatic transmission 30 by executing a program stored in the ROM 93. Specifically, the CPU 91 calculates a target gear stage SFT of the automatic transmission 30 based on the vehicle speed SPD and the requested vehicle power. When the latest target gear stage SFT differs from a previously calculated target gear stage SFT, the CPU 91 executes gear shifting control for shifting the gear stage. In the gear shifting control, the CPU 91 switches connected states or disconnected states of target friction engagement elements. For example, when the gear stage before the gear shifting is second gear, the first clutch C1 and the first brake B1 are connected, the second clutch C2 and the second brake B2 are disconnected, and the one-way clutch F1 permits rotation as illustrated in FIG. 2. When the target gear stage SFT is shifted from second gear to third gear, the CPU switches the first brake B1 to the disconnected state and the second clutch C2 to the connected state through the gear shifting control. As a result, the gear stage is switched to third gear.

In the gear shifting control, the CPU 91 switches the connected state and the disconnected state of the friction engagement element by controlling the hydraulic pressure to be supplied from the hydraulic circuit 67 to the friction engagement element. At this time, the CPU 91 calculates an instructive hydraulic pressure PZ that is an instruction value of the hydraulic pressure to be supplied from the hydraulic circuit 67 to each friction engagement element. In this embodiment, instructive hydraulic pressures PZ are calculated individually for the first clutch C1, the second clutch C2, the first brake B1, and the second brake B2. When the instructive hydraulic pressures PZ are calculated, the CPU 91 outputs a control signal G to the hydraulic apparatus 65 based on the instructive hydraulic pressures PZ as illustrated in FIG. 1. In response to the control signal G, the solenoid valves 63 of the hydraulic circuit 67 operate to adjust the hydraulic pressures to be supplied to the respective friction engagement elements.

In the gear shifting control, the CPU 91 changes each instructive hydraulic pressure PZ with an elapse of time as follows. Switching of the connected state and the disconnected state of the friction engagement element along with the change in the instructive hydraulic pressure PZ is described below in accordance with the change in the instructive hydraulic pressure PZ. A friction engagement element to be switched from the connected state to the disconnected state along with the gear shifting control is referred to as "disconnection-side friction engagement element". A friction engagement element to be switched from the disconnected state to the connected state along with the gear shifting control is referred to as "connection-side friction engagement element". For example, when the target gear stage SFT is shifted from second gear to third gear in the gear shifting control, the "disconnection-side friction engagement element" is the first brake B1, and the "connection-side friction engagement element" is the second clutch C2.

As illustrated in Portion (a) and Portion (d) in FIG. 3, when the gear shifting control is started in response to a shift of the target gear stage SFT (see "t1" in FIG. 3), the CPU 91 steeply reduces an instructive hydraulic pressure PZf for the disconnection-side friction engagement element from a disconnection-side keeping hydraulic pressure Lf. Then, the CPU 91 keeps the instructive hydraulic pressure PZf constant for a while, and then gradually reduces the instructive hydraulic pressure PZf. The disconnection-side keeping hydraulic pressure Lf is a hydraulic pressure necessary to keep the disconnection-side friction engagement element in the connected state.

As illustrated in Portion (c) in FIG. 3, when the gear shifting control is started (see "t1" in FIG. 3), the CPU 91 temporarily steeply increases an instructive hydraulic pressure PZc for the connection-side friction engagement element from "0". Then, the CPU 91 reduces the instructive hydraulic pressure to a waiting pressure, and waits a predetermined period. The waiting pressure is a hydraulic pressure immediately before the connection-side friction engagement element has a torque capacity that is a capability to transmit a torque. During the predetermined period, the distance between friction members of the connection-side friction engagement element decreases. At an end timing of the predetermined period (see "t3" in FIG. 3), the connection-side friction engagement element is in a so-called pack filling state immediately before the friction members of the connection-side friction engagement element abut against each other.

After an elapse of the predetermined period, the CPU 91 gradually increases the instructive hydraulic pressure PZc for the connection-side friction engagement element. As illustrated in Portion (c) and Portion (d) in FIG. 3, the CPU 91 starts to increase the instructive hydraulic pressure PZc for the connection-side friction engagement element during the reduction of the instructive hydraulic pressure PZf for the disconnection-side friction engagement element. Along with the increase of the instructive hydraulic pressure PZc for the connection-side friction engagement element by the CPU 91, the connection-side friction engagement element starts to bear a torque, and the torque transmitted by the connection-side friction engagement element gradually increases. Along with the reduction of the instructive hydraulic pressure PZf for the disconnection-side friction engagement element by the CPU 91, the torque transmitted by the disconnection-side friction engagement element decreases. In this manner, the friction engagement elements that transmit the torque are switched. When the instructive hydraulic pressure PZc for the connection-side friction engagement element increases to some degree, the CPU 91 sets the instructive hydraulic pressure PZf for the disconnection-side friction engagement element to "0" (see "t4" in FIG. 3). Along with this operation, the disconnection-side friction engagement element is disconnected. The period in which the friction engagement elements that transmit the torque are switched corresponds to a so-called torque phase.

The CPU 91 continues to increase the instructive hydraulic pressure PZc for the connection-side friction engagement element. Along with this operation, a rotation speed NA of the input shaft 41 of the automatic transmission 30 changes toward a rotation speed NA2 corresponding to a gear stage after the gear shifting as illustrated in Portion (b) in FIG. 3. When the rotation speed NA of the input shaft 41 reaches the rotation speed NA2 corresponding to the gear stage after the gear shifting and therefore the gear shifting is completed (see "t6" in FIG. 3), the CPU 91 steeply increases the instructive hydraulic pressure PZc for the connection-side friction engagement element to a connection-side keeping hydraulic pressure Lc. Along with this operation, the connection-side friction engagement element is connected. The connection-side keeping hydraulic pressure Lc is a hydraulic pressure necessary to keep the connection-side friction engagement element in the connected state. The period in which the rotation speed NA of the input shaft 41 changes toward the rotation speed NA2 corresponding to the gear stage after the gear shifting corresponds to a so-called inertia phase.

Through the series of processes described above, the CPU 91 terminates the gear shifting control. As described above, in the gear shifting control, the timing to start the switching of the connected states and the disconnected states of the friction engagement elements is the timing to steeply reduce the instructive hydraulic pressure PZf for the disconnection-side friction engagement element from the disconnection-side keeping hydraulic pressure Lf. The timing to terminate the switching of the connected states and the disconnected states of the friction engagement elements is the timing to steeply increase the instructive hydraulic pressure PZc for the connection-side friction engagement element to the connection-side keeping hydraulic pressure Lc.

In the series of processes described above, the CPU 91 calculates the instructive hydraulic pressures PZ for the connection-side friction engagement element and the disconnection-side friction engagement element based on the accelerator operation amount ACCP, the oil temperature Toil, and a gear shifting type variable ΔVsft. Based on those parameters, the CPU 91 calculates the magnitudes of the instructive hydraulic pressures PZ to be kept constant, and the change rates of the instructive hydraulic pressures PZ to be changed gradually. The gear shifting type variable ΔVsft is a variable for identifying a type of the change in the gear stage before and after the shift of the gear stage. For example, the gear shifting type variable ΔVsft indicates gear shifting from first gear to second gear, or gear shifting from second gear to first gear. The gear shifting type variable ΔVsft is defined as a positive integer for identifying the type of the shift of the gear stage. For example, the gear shifting type variable ΔVsft is "1" in the gear shifting from first gear to second gear, and is "2" in the gear shifting from second gear to first gear. The gear shifting type variable ΔVsft distinguishes power-ON gear shifting in a state in which the accelerator pedal 60 is depressed and power-OFF gear shifting in a state in which the accelerator pedal 60 is not depressed. When executing the gear shifting control, the CPU 91 calculates the gear shifting type variable ΔVsft based on target gear stages SFT before and after the shift at a stage in which the gear shifting control is started, and uses the gear shifting type variable ΔVsft for the calculation of the instructive hydraulic pressures PZ.

Next, description is given of a process for identifying phases in an execution period of the gear shifting control. During the execution of the gear shifting control, the CPU 91 executes a phase identification process for identifying a plurality of phases by dividing the execution period of the gear shifting control. The CPU 91 uses a phase identification result obtained through the phase identification process for calculation of an estimated hydraulic pressure PE described later. In this embodiment, the CPU 91 identifies five phases.

As illustrated in FIG. 3, a first phase Q1 is a period from the timing t1 when the gear shifting control is started in response to the shift of the target gear stage SFT to a timing t2 when the torque phase is started. The CPU 91 determines that the first phase Q1 is started when the phase identification process is started along with the start of the gear shifting control. In this embodiment, the longitudinal acceleration is used for determination about the start of the torque phase. When the torque phase is started, the torque transmitted by the disconnection-side friction engagement element decreases. Along with the decrease, the longitudinal acceleration W changes. The CPU 91 determines that the torque phase is started when an absolute value of a change rate of the longitudinal acceleration W per unit time is larger than a predetermined specified change rate after the start of the gear shifting control.

A second phase Q2 is a period from the timing t2 when the torque phase is started to the timing t3 when the pack filling of the connection-side friction engagement element is completed. In the gear shifting control, the length of a period from the start of the gear shifting control to the completion of the pack filling is determined in advance. The CPU 91 determines that the pack filling is completed when the predetermined period elapses from the start of the gear shifting control.

A third phase Q3 is a period from the timing t3 when the pack filling is completed to the timing t4 when the inertia phase is started. In this embodiment, the CPU 91 determines that the inertia phase is started when an absolute value of a difference between the rotation speed NA of the input shaft 41 of the automatic transmission 30 and a rotation speed NA1 of the input shaft 41 that is determined based on a gear stage before the gear shifting and a rotation speed NB of the output shaft 42 is equal to or larger than a predetermined determination reference value after the completion of the pack filling. The rotation speed NA1 determined based on the gear stage before the gear shifting and the rotation speed NB of the output shaft 42 is a rotation speed of the input shaft 41 under the assumption that the gear stage before the gear shifting is continued, and is obtained by multiplying a gear ratio corresponding to the gear stage before the gear shifting by the rotation speed NB of the output shaft 42. The CPU 91 calculates the rotation speed NA of the input shaft 41 and the rotation speed NB of the output shaft 42 of the automatic transmission 30 in the background. Specifically, the CPU 91 calculates a second rotation speed that is a rotation speed of the rotational shaft 62A of the second motor generator 62 based on a signal input from the second rotation angle sensor 54. The CPU 91 handles the second rotation speed as the rotation speed NA of the input shaft 41. The CPU 91 calculates the rotation speed NB of the output shaft 42 based on a signal input from the vehicle speed sensor 58.

A fourth phase Q4 is a period from the timing t4 when the inertia phase is started to a timing t5 when the change in the rotation speed NA of the input shaft 41 is stable. Specifically, the fourth phase Q4 is a transient period from a timing when the rotation speed NA of the input shaft 41 starts to change toward the rotation speed NA2 corresponding to the gear stage after the gear shifting to a timing when the rotation speed NA continues to change along a constant gradient. The CPU 91 determines that the change in the rotation speed NA of the input shaft 41 is stable when the change rate of the rotation speed NA of the input shaft 41 per unit time can be regarded as being substantially constant after the start of the inertia phase.

A fifth phase Q5 is a period from the timing t5 when the change in the rotation speed of the input shaft 41 is stable to the timing t6 when the gear shifting is completed. The CPU 91 determines that the gear shifting is completed when the rotation speed NA of the input shaft 41 is equal to the rotation speed NA2 corresponding to the gear stage after the gear shifting after the change in the rotation speed NA of the input shaft 41 is stabilized. The rotation speed NA2 corresponding to the gear stage after the gear shifting is obtained by multiplying a gear ratio corresponding to the gear stage after the gear shifting by the rotation speed NB of the output shaft 42.

The CPU 91 identifies the phases in the execution period of the gear shifting control through the phase identification process under the determination conditions described above. When the phases are identified, the CPU 91 calculates a phase variable Vpase. The phase variable Vpase is a variable for identifying a phase in the execution period of the gear shifting control. In this embodiment, the phase variable is defined as a positive integer for identifying each phase. For example, the phase variable is "1" in the first phase Q1, and is "2" in the second phase Q2. The controller 90 constitutes a gear shifting system together with the automatic transmission 30.

Next, description is given of a control configuration related to calculation of an estimated value PE of an actual hydraulic pressure (hereinafter referred to as "estimated hydraulic pressure") supplied from the hydraulic circuit 67 to the friction engagement element. As illustrated in FIG. 1, the memory 95 stores mapping data D for defining a mapping that uses various input variables as inputs and outputs an output variable. In this embodiment, the input variables include an instructive hydraulic pressure variable indicating the instructive hydraulic pressure. The input variables include an accelerator operation amount variable indicating the accelerator operation amount ACCP. The input variables include a gear shifting variable indicating a change in the gear stage before and after the switching of the connected state and the disconnected state of the friction engagement element. The input variables include an oil temperature variable indicating the oil temperature Toil. The input variables include an input shaft variable indicating the rotation speed NA of the input shaft 41 of the automatic transmission 30. The output variable is an estimated hydraulic pressure variable indicating the estimated hydraulic pressure PE.

The memory 95 stores connection mapping data Dc that is mapping data D to be used when the friction engagement element is switched to the connected state. That is, the connection mapping data Dc is mapping data D dedicated to the connection-side friction engagement element. The memory 95 stores pieces of connection mapping data Dc of the five phases, respectively. The memory 95 stores the five pieces of connection mapping data Dc of the individual phases for each of the four friction engagement elements. That is, the memory 95 of this embodiment stores a total of 20 pieces of connection mapping data Dc.

The memory 95 stores disconnection mapping data Df that is mapping data D to be used when the friction engagement element is switched to the disconnected state. That is, the disconnection mapping data Df is mapping data D dedicated to the disconnection-side friction engagement element. The memory 95 stores pieces of disconnection mapping data Df of the five phases, respectively. The memory 95 stores the five pieces of disconnection mapping data Df of the individual phases for each of the four friction engagement elements. That is, the memory 95 of this embodiment stores a total of 20 pieces of disconnection mapping data Df.

The CPU 91 can execute a connection hydraulic pressure calculation process for calculating an estimated hydraulic pressure PEc when the friction engagement element is switched to the connected state. The CPU 91 implements processes in the connection hydraulic pressure calculation process by executing a program stored in the ROM 93. In this embodiment, the CPU 91 and the ROM 93 constitute a processor.

In the connection hydraulic pressure calculation process, the CPU 91 executes an acquisition process, a selection process, and a calculation process. In the acquisition process, the CPU 91 acquires various input variables related to the switching of the connection-side friction engagement element to the connected state, such as the instructive hydraulic pressure PZc for the connection-side friction engagement element. In the selection process, the CPU 91 selects, from among the pieces of connection mapping data Dc of the individual phases that are stored in the memory 95, connection mapping data Dc associated with a phase in which the various input variables are acquired. In the calculation process, the CPU 91 calculates a value of the output variable by inputting values of the input variables acquired in the acquisition process to a mapping of the connection mapping data Dc selected in the selection process.

The CPU 91 can execute a disconnection hydraulic pressure calculation process for calculating an estimated hydraulic pressure PEf when the friction engagement element is switched to the disconnected state. The CPU 91 implements processes in the disconnection hydraulic pressure calculation process by executing a program stored in the ROM 93.

In the disconnection hydraulic pressure calculation process, the CPU 91 executes an acquisition process, a selection process, and a calculation process similarly to the connection hydraulic pressure calculation process. In the acquisition process, the CPU 91 acquires various input variables related to the switching of the disconnection-side friction engagement element to the disconnected state, such as the instructive hydraulic pressure PZf for the disconnection-side friction engagement element. In the selection process, the CPU 91 selects, from among the pieces of disconnection mapping data Df of the individual phases that are stored in the memory 95, disconnection mapping data Df associated with a phase in which the various input variables are acquired. In the calculation process, the CPU 91 calculates a value of the output variable by inputting values of the input variables acquired in the acquisition process to a mapping of the disconnection mapping data Df selected in the selection process.

Figure 4:
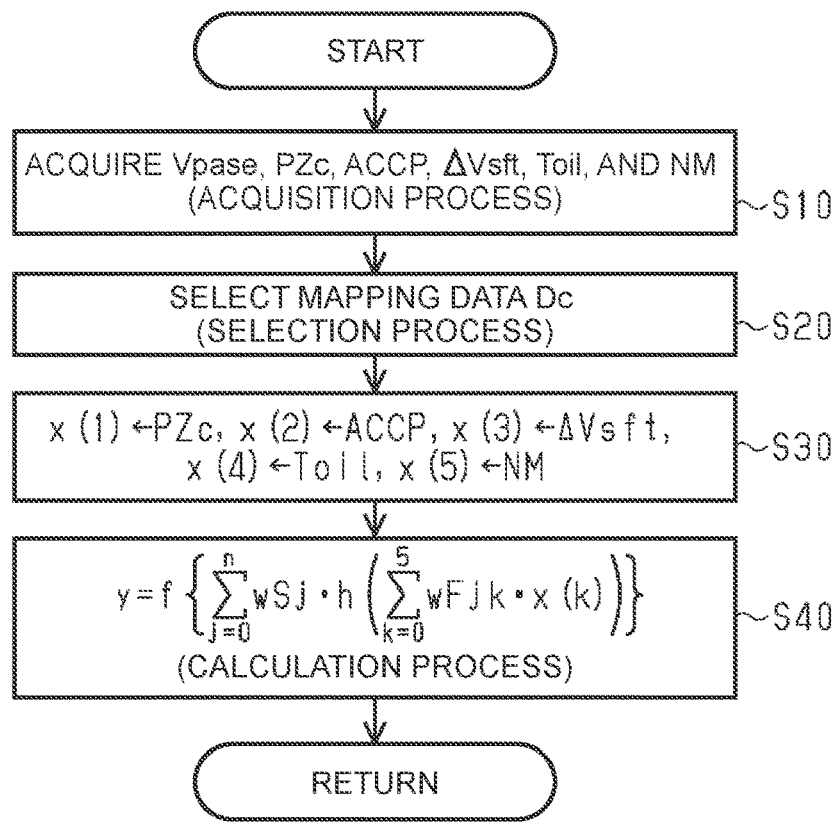
FIG. 4 is a flowchart illustrating a processing procedure of a connection hydraulic pressure calculation process.

Next, the processes in the connection hydraulic pressure calculation process are described in detail. During the execution of the gear shifting control, the CPU 91 repeatedly executes the connection hydraulic pressure calculation process. As illustrated in FIG. 4, when the connection hydraulic pressure calculation process is started, the CPU 91 executes a process of Step S10. In Step S10, the CPU 91 acquires various variables necessary in the processes of Step S20 and subsequent steps. Specifically, the CPU 91 acquires the phase variable Vpase, the instructive hydraulic pressure PZc for the connection-side friction engagement element, the accelerator operation amount ACCP, the gear shifting type variable ΔVsft, the oil temperature Toil, and an input shaft difference NM.

For the phase variable Vpase, the CPU 91 acquires the latest value calculated in the phase identification process. For the instructive hydraulic pressure PZc, the CPU 91 acquires the latest value calculated in the gear shifting control. The instructive hydraulic pressure PZc is the instructive hydraulic pressure variable. For the accelerator operation amount ACCP, the CPU 91 acquires the latest value input to the controller 90 from the accelerator position sensor 59. The accelerator operation amount ACCP is the accelerator operation amount variable. For the gear shifting type variable ΔVsft, the CPU 91 acquires the latest value calculated in the gear shifting control. The gear shifting type variable ΔVsft is the gear shifting variable. For the oil temperature Toil, the CPU 91 acquires the latest value input to the controller 90 from the oil temperature sensor 56. The oil temperature Toil is the oil temperature variable.

The input shaft difference NM is an absolute value of a difference between a current rotation speed NA of the input shaft 41 and the rotation speed NA2 of the input shaft 41 corresponding to the gear stage after the gear shifting. When acquiring the input shaft difference NM, the CPU 91 acquires the latest value of the rotation speed NA of the input shaft 41 that is calculated in the background, the latest value of the rotation speed NB of the output shaft 42, and the latest target gear stage SFT. The CPU 91 calculates an absolute value of a difference between the rotation speed NA of the input shaft 41 and a value obtained by multiplying a gear ratio corresponding to the target gear stage SFT by the rotation speed NB of the output shaft 42. The CPU 91 acquires the obtained value as the input shaft difference NM. Therefore, the input shaft difference NM indicates the magnitude of the current rotation speed NA of the input shaft 41 with respect to the rotation speed NA2 of the input shaft 41 corresponding to the gear stage after the gear shifting. That is, the input shaft difference NM is the input shaft variable.

When the values of the various variables are acquired as described above, the CPU 91 advances the process to Step S20. The process of Step S10 is the acquisition process. In Step S20, the CPU 91 selects connection mapping data Dc for use in the calculation of the estimated hydraulic pressure PEc based on the phase variable Vpase. The memory 95 stores, for each friction engagement element, a map that associates the phase variable Vpase with the connection mapping data Dc. By referring to the map, the CPU 91 selects, from among the pieces of connection mapping data Dc of the individual phases that are stored in the memory 95, connection mapping data Dc of the friction engagement element that is a target of the calculation of the estimated hydraulic pressure PEc in the phase corresponding to the phase variable Vpase. When the connection mapping data Dc is selected, the CPU 91 advances the process to Step S30. The process of Step S20 is the selection process.

In Step S30, the CPU 91 substitutes the values of the various variables acquired in the process of Step S10 for input variables x(1) to x(5) to be input to a mapping as a process prior to the calculation of the estimated hydraulic pressure PEc. Specifically, the CPU 91 substitutes the instructive hydraulic pressure PZc for the connection-side friction engagement element for the input variable x(1). The CPU 91 substitutes the accelerator operation amount ACCP for the input variable x(2). The CPU 91 substitutes the gear shifting type variable ΔVsft for the input variable (3). The CPU 91 substitutes the oil temperature Toil for the input variable x(4). The CPU 91 substitutes the input shaft difference NM for the input variable x(5). Then, the CPU 91 advances the process to Step S40.

In Step S40, the CPU 91 calculates an output variable y by inputting the input variables x(1) to x(5) to the mapping defined by the connection mapping data Dc selected in Step S20. The output variable y is the estimated hydraulic pressure PEc related to the connection-side friction engagement element.

The mapping is constructed as a fully connected feedforward neural network having one intermediate layer. The neural network includes an input-side coefficient wFjk (j=0 to n, k=0 to 5) and an activation function h(x). The activation function h(x) is an input-side nonlinear mapping that nonlinearly converts outputs from an input-side linear mapping. The input-side linear mapping is a linear mapping defined by the input-side coefficient wFjk. In this embodiment, a hyperbolic tangent "tanh(x)" is exemplified as the activation function h(x). The neural network further includes an output-side coefficient wSj (j=0 to n) and an activation function f(x). The activation function f(x) is an output-side nonlinear mapping that nonlinearly converts outputs from an output-side linear mapping. The output-side linear mapping is a linear mapping defined by the output-side coefficient wSj. In this embodiment, a hyperbolic tangent "tanh(x)" is exemplified as the activation function f(x). The value n indicates a dimension of the intermediate layer. An input-side coefficient wFj0 is a bias parameter, and serves as a coefficient of an input variable x(0). The input variable x(0) is defined as "1". An output-side coefficient wS0 is also a bias parameter.

The mapping is a model trained before installed in the vehicle 100 by using a power transmission apparatus including the internal combustion engine 10, the power split device 20, the automatic transmission 30, the hydraulic apparatus 65, the first motor generator 61, and the second motor generator 62 mounted on the vehicle 100. When training the mapping, training data and teaching data are acquired in advance. That is, the training data and the teaching data are created by attaching the power transmission apparatus to a chassis dynamometer and simulating traveling of the vehicle. When creating the training data and the teaching data, the gear shifting control is executed while variously setting the condition of the power transmission apparatus. The condition of the power transmission apparatus is determined by a combination of the gear shifting type variable ΔVsft, the accelerator operation amount ACCP, and the oil temperature Toil. That is, the gear shifting control is executed while simulating situations obtained by variously combining values of those parameters, and actual hydraulic pressures in the individual situations are acquired as pieces of teaching data. The actual hydraulic pressure may be acquired by attaching a hydraulic pressure sensor to the hydraulic circuit 67 and acquiring a value detected by the hydraulic pressure sensor. At the same timing as that of the acquisition of the actual hydraulic pressures, the values of various variables serving as input variables of the mapping are acquired as pieces of training data. At this time, the values of the various variables are acquired similarly to the process of Step S10. In this manner, the pieces of training data and the pieces of teaching data are acquired under the individual conditions of the power transmission apparatus, and the mapping is trained by using combinations of the training data and the teaching data associated with the conditions of the power transmission apparatus. That is, input-side variables and output-side variables are adjusted for the various conditions of the power transmission apparatus so that a difference between a value output from the mapping by inputting the training data and the teaching data that is the actual hydraulic pressure is equal to or smaller than a predetermined value. The training is completed when the difference is equal to or smaller than the predetermined value. The mapping is trained for a phase corresponding to the mapping.

When the estimated hydraulic pressure PEc is calculated as the output variable y in Step S40, the CPU 91 temporarily terminates the series of processes in the connection hydraulic pressure calculation process. Then, the CPU 91 executes the process of Step S10 again under a condition that the gear shifting control is being executed. The process of Step S40 is the calculation process.

Similarly to the connection hydraulic pressure calculation process, the CPU 91 repeatedly executes the disconnection hydraulic pressure calculation process during the execution of the gear shifting control. The disconnection hydraulic pressure calculation process is basically the same as the connection hydraulic pressure calculation process, and therefore detailed description is omitted. The disconnection hydraulic pressure calculation process differs from the connection hydraulic pressure calculation process in terms of the following matters. In the acquisition process, the CPU 91 acquires the instructive hydraulic pressure PZf for the disconnection-side friction engagement element in place of the instructive hydraulic pressure PZc for the connection-side friction engagement element. In the selection process, the CPU 91 selects, from among the pieces of disconnection mapping data Df of the individual phases that are stored in the memory 95 in place of the pieces of connection mapping data Dc, disconnection mapping data Df associated with a phase of the gear shifting control. In the calculation process, the CPU 91 calculates the estimated hydraulic pressure PEf related to the disconnection-side friction engagement element as the output variable y by using a mapping defined by the disconnection mapping data Df in place of the connection mapping data Dc.

Next, actions of this embodiment are described. During the execution of the gear shifting control, the CPU 91 calculates the estimated hydraulic pressure PEc related to the connection-side friction engagement element by using the connection mapping data Dc. At this time, the CPU 91 selects the connection mapping data Dc associated with any phase of the gear shifting control, and calculates the estimated hydraulic pressure PEc by inputting various input variables to the selected connection mapping data Dc.

During the execution of the gear shifting control, the CPU 91 calculates the estimated hydraulic pressure PEf related to the disconnection-side friction engagement element by using the disconnection mapping data Df. At this time, the CPU 91 selects the disconnection mapping data Df associated with any phase of the gear shifting control, and calculates the estimated hydraulic pressure PEf by inputting various input variables to the selected disconnection mapping data Df.

Next, effects of this embodiment are described.

(1) As indicated by a long dashed double-short dashed line PWc in Portion (c) in FIG. 3, the actual hydraulic pressure supplied to the connection-side friction engagement element lags behind the instructive hydraulic pressure PZc, or gently changes as compared to a steep change in the instructive hydraulic pressure PZc. As indicated by a long dashed double-short dashed line PWf in Portion (d) in FIG. 3, the actual hydraulic pressure supplied to the disconnection-side friction engagement element also changes with a deviation from the instructive hydraulic pressure PZf. To accurately calculate the estimated hydraulic pressure PE in view of those circumstances, the relationship between the instructive hydraulic pressure PZ and the actual hydraulic pressure needs to be reflected appropriately in the calculation of the estimated hydraulic pressure PE.

To reflect the relationship between the instructive hydraulic pressure PZ and the actual hydraulic pressure in the calculation of the estimated hydraulic pressure PE, it is conceivable to derive a relational expression representing the relationship between the instructive hydraulic pressure PZ and the actual hydraulic pressure and use the relational expression for the calculation of the estimated hydraulic pressure PE. However, the characteristic of the change in the instructive hydraulic pressure PZ over time varies depending on the phase of the gear shifting control. Along with this variation, the relationship between the instructive hydraulic pressure PZ and the actual hydraulic pressure also varies depending on the phase of the gear shifting control. Thus, it is difficult to derive a relational expression applicable to all the phases in the execution period of the gear shifting control. Alternatively, it is conceivable to derive relational expressions for the individual phases of the gear shifting control. In this case, however, it is necessary to derive relational expressions suited to the individual phases by analyzing the relationship between the instructive hydraulic pressure PZ and the actual hydraulic pressure multiple times for the individual phases. Thus, it takes a great deal of time and effort.

In the case where the estimated hydraulic pressure PE is calculated by using the mapping as in the configuration described above, the relationship between the instructive hydraulic pressure PZ and the actual hydraulic pressure can be reflected in the calculation of the estimated hydraulic pressure PE without time and effort for deriving a complicated relational expression as long as appropriate training data and teaching data can be prepared. In the configuration described above, the mappings dedicated to the individual phases are used. Therefore, relationships between the instructive hydraulic pressure PZ and the actual hydraulic pressure that are suited to the individual phases can be reflected in the calculation of the estimated hydraulic pressure PE. When calculating the estimated hydraulic pressure PE by using the mapping, the accuracy of the estimated hydraulic pressure PE can be secured as long as several pieces of training data and teaching data can be prepared. In the configuration described above, not only the instructive hydraulic pressure PZ but also the plurality of variables is employed as the input variables. Therefore, the estimated hydraulic pressure PE can be calculated in consideration of the relationships between the variables and the actual hydraulic pressure. Thus, the estimated hydraulic pressure PE can be calculated with high accuracy.

(2) The characteristic of the change over time in the execution period of the gear shifting control differs between the instructive hydraulic pressure PZc for the connection-side friction engagement element and the instructive hydraulic pressure PZf for the disconnection-side friction engagement element. Therefore, the relationship between the instructive hydraulic pressure PZ and the actual hydraulic pressure differs between the connection-side friction engagement element and the disconnection-side friction engagement element. By using the mappings dedicated to the connection-side friction engagement element and the disconnection-side friction engagement element as in the configuration described above, the respective estimated hydraulic pressures PE can be calculated accurately.

(3) The torque applied to the automatic transmission 30 varies depending on the accelerator operation amount ACCP. In relation to this fact, the way of changing the instructive hydraulic pressure PZ, such as an increase rate of the instructive hydraulic pressure PZc for the connection-side friction engagement element or a decrease rate of the instructive hydraulic pressure PZf for the disconnection-side friction engagement element in the torque phase, varies depending on the accelerator operation amount ACCP. Since the way of changing the instructive hydraulic pressure PZ varies, the relationship between the instructive hydraulic pressure PZ and the actual hydraulic pressure varies as well. By including the accelerator operation amount ACCP as one of the input variables of the mapping as in the configuration described above, the estimated hydraulic pressure PE can be calculated in consideration of the relationship between the instructive hydraulic pressure PZ and the actual hydraulic pressure based not only on the magnitude of the instructive hydraulic pressure PZ but also on the way of changing the instructive hydraulic pressure PZ.

(4) Similarly to the accelerator operation amount ACCP in Section (3), the way of changing the instructive hydraulic pressure PZ varies depending on the type of the change in the gear stage. For example, the way of changing the instructive hydraulic pressure PZ may differ between a case where the gear stage is changed from first gear to second gear and a case where the gear stage is changed from third gear to second gear, though both the cases are the same in that the first brake B1 is switched to the connected state. By including the gear shifting type variable $\Delta V$sft as one of the input variables as in the configuration described above, the estimated hydraulic pressure PE can be calculated in consideration of the relationship between the instructive hydraulic pressure PZ and the actual hydraulic pressure based on the way of changing the instructive hydraulic pressure PZ.

(5) When the oil temperature Toil is low, the actual hydraulic pressure is difficult to increase because the viscosity of the oil is low. By including the oil temperature Toil as one of the input variables as in the configuration described above, the estimated hydraulic pressure PE can be calculated in consideration of the characteristic of the actual hydraulic pressure based on the oil temperature Toil.

(6) The input shaft difference NM is the absolute value of the difference between the current rotation speed NA of the input shaft 41 and the rotation speed NA2 of the input shaft 41 corresponding to the gear stage after the gear shifting. In the first phase Q1 to the third phase Q3 prior to the inertia phase, the input shaft difference NM is substantially constant. In the fourth phase Q4 and the fifth phase Q5 corresponding to the inertia phase, the input shaft difference NM deceases as the chronological stage of the gear shifting control advances. Therefore, the input shaft difference NM in the fourth phase Q4 and the fifth phase Q5 may serve as an index of the chronological stage in the same phase. By including the input shaft difference NM as one of the input variables as in the configuration described above, the estimated hydraulic pressure PE can be calculated in consideration of the chronological stage in the same phase. Thus, the estimated hydraulic pressure PE can be calculated in consideration of the relationship between the instructive hydraulic pressure PZ and the actual hydraulic pressure at a finer stage than the division range of each phase.

Figure 5:
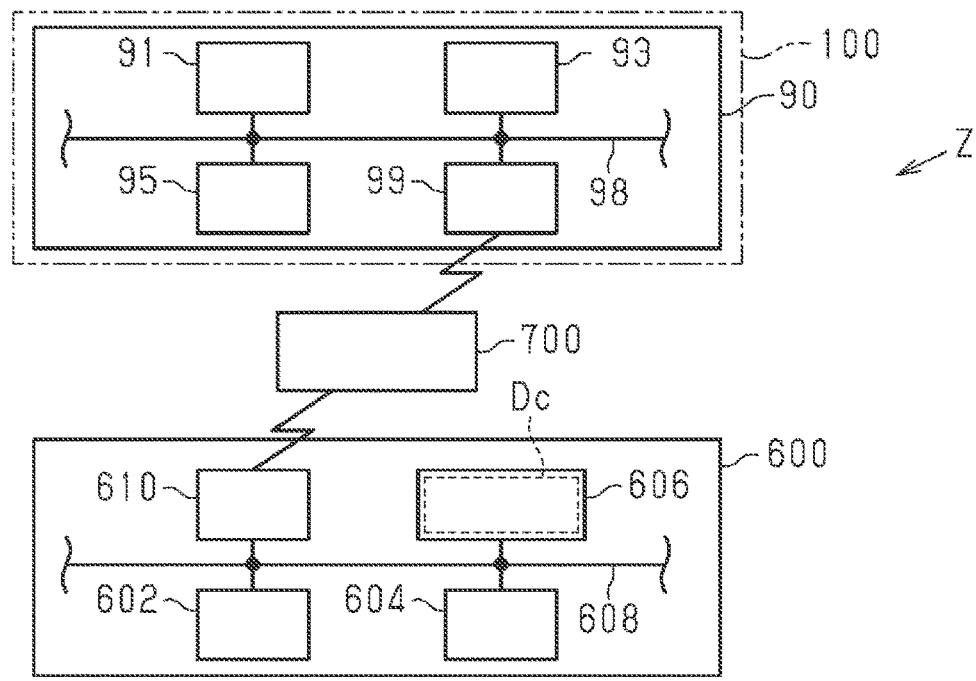
FIG. 5 is a schematic diagram illustrating a modified example of a hydraulic pressure calculation apparatus.

This embodiment may be modified as follows. This embodiment and the following modified examples may be combined without causing any technical contradiction. A part of the connection hydraulic pressure calculation process may be executed by a computer outside the vehicle 100. For example, as illustrated in FIG. 5, a server 600 may be provided outside the vehicle 100. The server 600 may execute the selection process and the calculation process in the connection hydraulic pressure calculation process. In this case, the server 600 may be constructed as one or more processors configured to execute various processes based on computer programs (software). The server 600 may also be constructed as one or more dedicated hardware circuits such as an application-specific integrated circuit (ASIC) configured to execute at least a part of the various processes, or as circuitry including a combination of those hardware circuits. The processor includes a CPU 602 and a memory including a RAM and a ROM 604. The memory stores program codes or commands for causing the CPU 602 to execute processes. The memory, that is, a computer-readable medium includes any available medium accessible to a general-purpose or dedicated computer. The server 600 includes a memory 606 that is an electrically rewritable non-volatile memory. The memory 606 stores the pieces of connection mapping data Dc of the individual phases that are described in the embodiment above. The server 600 includes a communication device 610 for connection to the outside of the server 600 via an external communication network 700. The CPU 602, the ROM 604, the memory 606, and the communication device 610 are communicable with each other via an internal bus 608.

In the case where the server 600 executes the selection process and the calculation process in the connection hydraulic pressure calculation process, the controller 90 of the vehicle 100 includes a communication device 99 for communication with the outside of the controller 90 via the external communication network 700. The configuration of the controller 90 is the same as that in the embodiment described above except that the communication device 99 is provided. Therefore, detailed description of the controller 90 is omitted. In FIG. 5, parts having the same functions as those in FIG. 1 are represented by the same reference symbols as those in FIG. 1. The controller 90 constitutes a hydraulic pressure calculation apparatus Z together with the server 600.

In the case where the server 600 executes the selection process and the calculation process in the connection hydraulic pressure calculation process, the controller 90 of the vehicle 100 first executes the acquisition process of Step S10 in the embodiment described above. When various variables are acquired through the process of Step S10, the controller 90 transmits values of the acquired various variables to the server 600. When the values of the various variables are received, the CPU 602 of the server 600 calculates the estimated hydraulic pressure PEc related to the connection-side friction engagement element by executing the processes of Step S20, Step S30, and Step S40 in the embodiment. The CPU 602 of the server 600 executes the processes of Step S20, Step S30, and Step S40 by executing a program stored in the ROM 604.

In the case where the controller 90 of the vehicle 100 and the server 600 execute the connection hydraulic pressure calculation process as in this modified example, the CPU 91 and the ROM 93 of the controller 90 of the vehicle 100 and the CPU 602 and the ROM 604 of the server 600 constitute the processor.

All the processes in the connection hydraulic pressure calculation process may be executed by the computer outside the vehicle 100. For example, in the case where the server 600 is provided outside the vehicle 100 as in the modified example described above, the controller 90 of the vehicle 100 transmits, to the server 600, detection signals from various sensors attached to the vehicle 100. The controller 90 of the vehicle 100 also transmits, to the server 600, other variables for use in the connection hydraulic pressure calculation process, such as the phase variable Vpase and the gear shifting type variable ΔVsft. The CPU 602 of the server 600 acquires values of the various variables by executing a process corresponding to that of Step S10 in the embodiment described above. Similarly to the modified example, the CPU 602 of the server 600 then executes processes corresponding to those of Step S20, Step S30, and Step S40. In this configuration, the server 600 executes the acquisition process, the selection process, and the calculation process.

A part or all of the disconnection hydraulic pressure calculation process may be executed by the server 600. In this case, the memory 606 of the server 600 may store the pieces of disconnection mapping data Df of the individual phases of the gear shifting control.

In the embodiment described above, both the connection hydraulic pressure calculation process and the disconnection hydraulic pressure calculation process are executed, but only one of those calculation processes may be executed and the other may be omitted. In this case, the memory 95 need not store the pieces of mapping data D for use in the omitted process.

In the embodiment described above, the estimated hydraulic pressure PE may be calculated by using the same mapping data D when the friction engagement element is switched to the connected state and when the friction engagement element is switched to the disconnected state. It is presumed that the connected state and the disconnected state are similar to each other in terms of behavior such as a delay in the actual hydraulic pressure from the instructive hydraulic pressure PZ in each phase in the execution period of the gear shifting control. As long as the pieces of mapping data D are prepared for the individual phases, a certain level of accuracy can be expected in the estimated hydraulic pressure PE even when the same mapping data D is used in the switching to the connected state and the switching to the disconnected state.

The method for determining the phases in the execution period of the gear shifting control is not limited to the example of the embodiment described above. Any determination method may be employed as long as the start and end of each phase can be determined appropriately. The method for dividing the phases in the execution period of the gear shifting control is not limited to the example of the embodiment. For example, the phases may be divided into three stages that are a stage before the torque phase, a stage in the torque phase, and a stage in the inertia phase. In a case where the method for dividing the phases is changed from the method of the embodiment, the memory 95 may store pieces of mapping data D of the changed phases.

The method for dividing the phases in the calculation of the estimated hydraulic pressure PEc related to the connection-side friction engagement element may differ from the method for dividing the phases in the calculation of the estimated hydraulic pressure PEf related to the disconnection-side friction engagement element.

The accelerator operation amount ACCP to be acquired in Step S10 is not limited to the latest value at the time of execution of the process of Step S10. For example, a maximum value of the accelerator operation amount ACCP during a period from execution of Step S10 at a preceding timing to execution of Step S10 at a succeeding timing may be acquired. Instead of acquiring the instantaneous value, an average of accelerator operation amounts ACCP during a predetermined period may be acquired. The same applies to the oil temperature Toil.

The variable to be employed as the instructive hydraulic pressure variable is not limited to the example of the embodiment described above. For example, the instructive hydraulic pressure variable may be a value obtained by multiplying the instructive hydraulic pressure PZ by a correction coefficient appropriate to accurately calculate the estimated hydraulic pressure PE. The instructive hydraulic pressure variable may be any variable indicating the instructive hydraulic pressure.

The variable to be employed as the accelerator operation amount variable is not limited to the example of the embodiment described above. For example, the accelerator operation amount variable may be a value indicating any one of a plurality of levels of the accelerator operation amount ACCP. The accelerator operation amount variable may be any variable indicating the accelerator operation amount ACCP.

The variable to be employed as the gear shifting variable is not limited to the example of the embodiment described above. For example, the gear shifting variable may be a positive or negative value that distinguishes the target gear stage SFT after the shift between an upshifted gear stage and a downshifted gear stage. The gear shifting variable may be any variable indicating the change in the gear stage before and after the switching of the friction engagement element.

The variable to be employed as the oil temperature variable is not limited to the example of the embodiment described above. For example, the oil temperature variable may be a value indicating any one of a plurality of levels of the oil temperature Toil. The oil temperature variable may be any variable indicating the oil temperature Toil.

The variable to be employed as the input shaft variable is not limited to the example of the embodiment described above. The input shaft variable may be a variable indicating a change in the input shaft 41. For example, the input shaft variable may be a change rate of the rotation speed NA of the input shaft 41 per unit time. Depending on how the phases are divided, the change rate of the rotation speed NA of the input shaft 41 may also serve as the index of the chronological stage in the same phase. The input shaft variable may be any variable indicating the rotation speed NA of the input shaft 41 or the change in the rotation speed NA of the input shaft.

The type of the input variable is not limited to the examples of the embodiment described above. The input variables may be any other variables in place of or in addition to the variables described in the embodiment. The number of the input variables may be reduced from the number in the embodiment. It is only necessary that the number of the input variables be two or more, and one out of the two or more input variables be the instructive hydraulic pressure variable.

The accelerator operation amount variable, the gear shifting variable, the oil temperature variable, and the input shaft variable are not essential as the input variables. Even if those variables are not included, the estimated hydraulic pressure PE can be calculated with a certain level of high accuracy as long as two or more variables including the instructive hydraulic pressure variable are employed as the input variables.

The input variable may be a variable other than the variables described in the embodiment above. For example, the input variable may be a variable indicating the degree of deterioration of the hydraulic circuit 67 over time. Specifically, the variable indicating the degree of deterioration of the hydraulic circuit 67 over time may be a total traveling distance of the vehicle 100. A response of the actual hydraulic pressure to the instructive hydraulic pressure PZ may change depending on the degree of deterioration of the hydraulic circuit 67 over time. By employing the variable indicating the degree of deterioration of the hydraulic circuit 67 over time as one of the input variables, the estimated hydraulic pressure PE can be calculated in consideration of the degree of deterioration of the hydraulic circuit 67 over time.

The variable to be employed as the estimated hydraulic pressure variable is not limited to the example of the embodiment described above. For example, the estimated hydraulic pressure variable may be a value obtained by converting the hydraulic pressure into a flow rate of the oil. The estimated hydraulic pressure variable may be any variable indicating the estimated hydraulic pressure PE.

The configuration of the mapping is not limited to the example of the embodiment described above. For example, the neural network may have two or more intermediate layers. For example, the neural network may be a recurrent neural network. In this case, previous values of the input variables are reflected when the value of the output variable is newly calculated. Therefore, the recurrent neural network is appropriate to calculate the estimated hydraulic pressure PE while reflecting previous records.

The method for acquiring the training data and the teaching data to be used for training the mapping is not limited to the example of the embodiment described above. For example, the training data and the teaching data may be acquired such that a vehicle having the same specifications as those of the vehicle 100 travels actually.

The structure of the vehicle 100 is not limited to the example of the embodiment described above. For example, only the internal combustion engine 10 may be mounted as the drive source of the vehicle 100. The automatic transmission may be a continuously variable transmission.

The change in the instructive hydraulic pressure PZ over time in the gear shifting control is not limited to the example of the embodiment described above. The instructive hydraulic pressure PZ may change in any fashion over time as long as the connected state and the disconnected state of the friction engagement element can be switched appropriately.

What is claimed is:

1. A hydraulic pressure calculation apparatus to be applied to a gear shifting system including a transmission configured to switch between a connected state and a disconnected state of a friction engagement element depending on a hydraulic pressure supplied from a hydraulic circuit, and a hydraulic controller configured to control the hydraulic circuit, the hydraulic pressure calculation apparatus comprising:

a memory; and a processor, wherein:

the memory stores pieces of mapping data of a plurality of phases obtained by dividing a period from a start of switching between the connected state and the disconnected state of the friction engagement element to an end of switching between the connected state and the disconnected state of the friction engagement element, each of the pieces of mapping data defining a mapping;

the processor is configured to output, as an output variable, an estimated hydraulic pressure variable that is a variable indicating an estimated value of an actual hydraulic pressure supplied from the hydraulic circuit to the friction engagement element;

the mapping includes, as one of a plurality of input variables, an instructive hydraulic pressure variable that is a variable indicating an instructive hydraulic pressure calculated by the hydraulic controller as an instruction value of the hydraulic pressure to be supplied from the hydraulic circuit to the friction engagement element; and the processor is configured to execute an acquisition process for acquiring values of the input variables, a selection process for selecting, from among the pieces of mapping data of the phases, a piece of the mapping data associated with a phase in which the values of the input variables are acquired, and a calculation process for calculating a value of the output variable by inputting the values of the input variables acquired in the acquisition process to the mapping of the mapping data selected in the selection process.

2. The hydraulic pressure calculation apparatus according to claim 1, wherein:

the memory stores, for the phases, pieces of connection mapping data that are mapping data to be used when the friction engagement element is switched to the connected state, and pieces of disconnection mapping data that are mapping data to be used when the friction engagement element is switched to the disconnected state;

the processor is configured to, in a case where the input variables are acquired in the acquisition process when the friction engagement element is switched to the connected state, select, from among the pieces of connection mapping data of the phases, a piece of the connection mapping data associated with a phase in which the input variables are acquired, in the selection process; and the processor is configured to, in a case where the input variables are acquired in the acquisition process when the friction engagement element is switched to the disconnected state, select, from among the pieces of disconnection mapping data of the phases, a piece of the disconnection mapping data associated with a phase in which the input variables are acquired, in the selection process.

3. The hydraulic pressure calculation apparatus according to claim 1, wherein an accelerator operation amount variable that is a variable indicating an operation amount of an accelerator pedal of a vehicle on which the transmission is mounted is included as one of the input variables.

4. The hydraulic pressure calculation apparatus according to claim 1, wherein a gear shifting variable that is a variable indicating a change in a gear stage before and after switching between the connected state and the disconnected state of the friction engagement element is included as one of the input variables.

5. The hydraulic pressure calculation apparatus according to claim 1, wherein an oil temperature variable that is a variable indicating a temperature of oil in the hydraulic circuit is included as one of the input variables.

6. The hydraulic pressure calculation apparatus according to claim 1, wherein an input shaft variable that is a variable indicating a rotation speed of an input shaft of the transmission or a change in the rotation speed of the input shaft is included as one of the input variables.

\* \* \* \* \*